US010018268B2

United States Patent
Hoffmeister et al.

(10) Patent No.: US 10,018,268 B2
(45) Date of Patent: Jul. 10, 2018

(54) COMPENSATION OF INFLUENCE OF TRANSVERSE ACCELERATION ON BRAKING SHIFT-DOWN POINTS

(71) Applicant: Dr. Ing. h.c. F. Porsche Aktiengesellschaft, Stuttgart (DE)

(72) Inventors: Jan-Peter Hoffmeister, Leonberg (DE); Torsten Mueller, Stuttgart (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 15/415,898

(22) Filed: Jan. 26, 2017

(65) Prior Publication Data

US 2017/0219093 A1 Aug. 3, 2017

(30) Foreign Application Priority Data

Jan. 28, 2016 (DE) .................. 10 2016 101 522

(51) Int. Cl.
*F16H 61/02* (2006.01)
*F16H 59/48* (2006.01)
*F16H 59/58* (2006.01)
*F16H 61/21* (2006.01)
*F16H 61/00* (2006.01)

(52) U.S. Cl.
CPC ......... *F16H 61/0213* (2013.01); *F16H 59/48* (2013.01); *F16H 59/58* (2013.01); *F16H 61/21* (2013.01); *B60Y 2300/1815* (2013.01); *B60Y 2300/70* (2013.01); *F16H 2061/009* (2013.01); *F16H 2061/0234* (2013.01); *F16H 2302/02* (2013.01)

(58) Field of Classification Search
None
See application file for complete search history.

(56) References Cited

U.S. PATENT DOCUMENTS

| | | | | |
|---|---|---|---|---|
| 5,044,230 A * | 9/1991 | Shinya | ................ | F16H 61/0213 477/119 |
| 5,182,710 A * | 1/1993 | Tomisawa | ............... | F16H 59/00 477/143 |
| 6,085,137 A * | 7/2000 | Aruga | ..................... | F16H 59/66 477/120 |
| 6,220,986 B1 * | 4/2001 | Aruga | ................. | F16H 61/0213 477/97 |
| 7,734,404 B2 * | 6/2010 | Shiiba | ................ | B60K 31/0066 303/121 |
| 7,747,372 B2 * | 6/2010 | Mathis | ................ | F16H 61/0213 477/107 |
| 9,574,657 B1 * | 2/2017 | Harris et al. | ........ | F16H 61/0265 |
| 2013/0179044 A1 * | 7/2013 | Ishikawa | ................ | B60W 10/11 701/53 |

* cited by examiner

*Primary Examiner* — Justin Holmes
(74) *Attorney, Agent, or Firm* — Leydig, Voit & Mayer, Ltd.

(57) ABSTRACT

A method for controlling an automatic transmission of a vehicle includes detecting a deceleration of the vehicle; detecting a cornering value of the vehicle; determining, as a function of the deceleration and as a function of the cornering value, a compensated shift-down point of a rotational speed at which shifting into a relatively low gear of the transmission occurs; and selecting a gear as a function of the compensated shift-down point.

12 Claims, 4 Drawing Sheets

COMPENSATION OF INFLUENCE OF TRANSVERSE ACCELERATION ON BRAKING SHIFT-DOWN POINTS

CROSS REFERENCE TO RELATED APPLICATIONS

This application claims benefit to German Patent Application No. DE 10 2016 101 522.9 filed Jan. 28, 2016, which is hereby incorporated by reference herein.

FIELD

The present invention relates to a method for raising shift-down points at relatively high rotational speeds of an automatic transmission as a function of a deceleration of a vehicle.

BACKGROUND

It is known that control units of automatic transmissions raise the shift-down points of the transmission as a function of a braking process and the associated deceleration of the vehicle, and therefore shift earlier into a lower gear. As a result, the driving behavior is modeled in analogous fashion to the operator control of a manual shift transmission, with the result that the torque of the engine can be used better in the case of braking. In addition, this permits a more dynamic driving style by shifting down, for example before a bend.

A known solution for raising the shift-down point in automatic transmissions is provided, for example, by the intelligent shift program (ISP) by the applicant. This raises the shift-down points as a function of the deceleration (a_l).

However, in the known method the problem occurs that if braking into a bend is carried out during transverse acceleration, the possible deceleration of the vehicle is less than on a straight section of road. Therefore, the shift-down points when braking in a bend are not displaced to the same extent as on a straight section of road. This may be found to be disruptive, in particular in the case of a dynamic driving style.

SUMMARY

In an embodiment, the present invention provides a method for controlling an automatic transmission of a vehicle. The method includes detecting a deceleration of the vehicle; detecting a cornering value of the vehicle; determining, as a function of the deceleration and as a function of the cornering value, a compensated shift-down point of a rotational speed at which shifting into a relatively low gear of the transmission occurs; and selecting a gear as a function of the compensated shift-down point.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
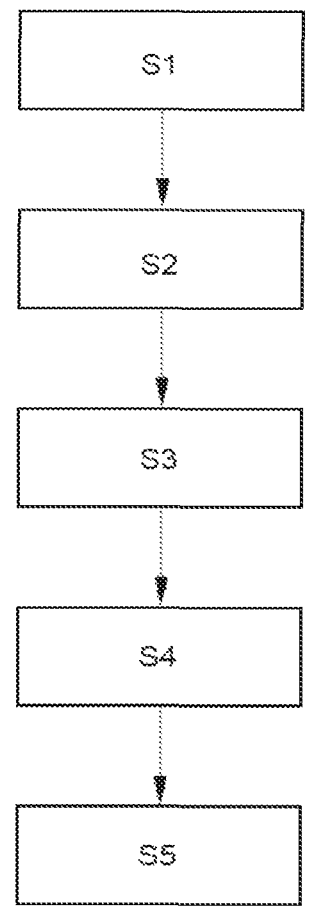
FIG. 1 is a schematic view of a method for determining a shift-down point according to the prior art.

A method for improving the previous method for use in cornering is described herein.

A method for controlling an automatic transmission of a vehicle is described herein that comprises detecting a deceleration (a_l) of the vehicle; detecting a cornering value (alpha, a_q) of the vehicle; determinating, as a function of the deceleration (a_l) and as a function of the cornering value (alpha a_q), a compensated shift-down point (R_k) of a rotational speed (n) at which shifting into a relatively low gear of the transmission occurs; and selecting a gear as a function of the compensated shift-down point.

The method described herein can have the advantage that a cornering value of the vehicle is measured and is taken into account during the raising of the shift-down point.

Advantageous refinements and developments of embodiments the invention can be found in the dependent claims and the description with reference to the drawings.

There is preferably provision that a total force is determined from the deceleration (a_l) and the cornering value (alpha, a_q), and the compensated shift-down point is raised for increasing total force. This ensures that the transmission already shifts to the next lowest gear when low deceleration occurs in a bend.

According to one preferred embodiment of the present invention, a transverse acceleration (a_q) is detected as a cornering value, and the total force (a_ges) is calculated as an absolute value of a two-dimensional vector with the entries deceleration (a_l) and transverse acceleration (a_q). This calculation corresponds to Pythagoras' theorem in which the deceleration (a_l) and the transverse force (a_q) describe the cathetus, and the total force describes the hypotenuse of a right-angled triangle.

In a further embodiment, a steering angle (alpha) can be detected as a cornering value, and the total force can be determined from division of the deceleration (a_l) by the cosine of the steering angle (alpha). This has the advantage that no additional sensor is needed to detect the transverse acceleration.

According to a further embodiment, the compensation factor k can be determined from a characteristic curve, which characteristic curve is a function of the cornering value, and the compensated shift-down point is determined by means of the compensation factor k. As a result, the dependence on the cornering value can be selected freely.

A control unit for an automatic transmission according to an embodiment of the invention has a first detection device designed to detect a deceleration (a_l) of a vehicle; a second detection device designed to detect a cornering value (alpha, a_q) of a vehicle; a computing unit designed to determine a gear as a function of the deceleration (a_l), of the cornering value (alpha, a_q) and of a claimed method; and an output unit designed to transfer the gear to a transmission.

In the various figures, identical parts are always provided with the same reference symbols, and are therefore generally also specified or mentioned only once in each case.

FIG. 1 is a schematic view of a method for determining a shift-down point for an automatic transmission according to the prior art.

In a first step S1, a regular shift-down point R is defined. If the rotational speed of the automatic transmission undershoots the shift-down point R, shifting into the next lowest gear takes place. This regular shift-down point R is independent of forces, such as, for example, acceleration, deceleration and transverse acceleration, which act on the vehicle.

In a second step S2, a control unit detects the deceleration (a_l) of a vehicle, which deceleration (a_l) describes the negative acceleration of a vehicle, for example during a braking process or an uphill gradient on a road. The control unit can have for this, for example, an acceleration sensor for this.

In a third step S3, a gain factor v is determined by means of the deceleration. Said gain factor v is a function of the deceleration:

$$V=f\_1(a\_l). \quad (1)$$

In a subsequent step S4, a deceleration shift-down point R_v is determined for the transmission, which shift-down point R_v is obtained from multiplication of the regular shift-down point R by the gain factor v:

$$R\_v=v*R \quad (2)$$

In a last step S5, it is continuously checked whether the rotational speed of the automatic transmission undershoots the deceleration shift-down point R_v. If this is the case, shifting into the next lowest gear speed takes place.

Figure 2:
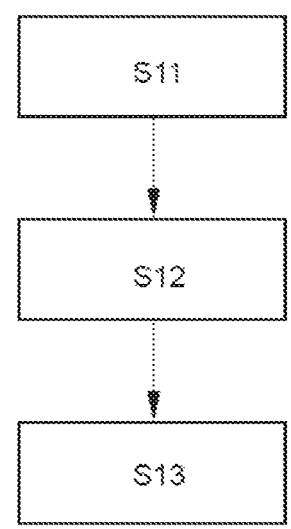
FIG. 2 is a schematic view of a method for determining a shift-down point according to an embodiment of the invention.

FIG. 2 illustrates a method according to a first exemplary embodiment of the present invention.

In this context, in a first step S11, the deceleration (a_l) and a transverse acceleration (a_q) of the vehicle are determined. For this, the control unit has, for example, in each case acceleration values for the deceleration and for the transverse acceleration. Alternatively, the control unit can also receive this from other vehicle systems. For example, these values can be determined from other control systems such as ESP, a traction control system, ABS, etc. and made available via a CAN bus. The deceleration can also be determined from the measured speed by means of simple derivation. This calculation can be carried out either by means of another vehicle system or by the control unit itself by the current speed of the vehicle being continuously transferred thereto.

In a subsequent step S12, a compensator shift-down point R_k is determined as a function of the deceleration and the transverse acceleration:

$$R\_k=f\_2(a\_l,a\_q) \quad (3)$$

For this purpose, there may, for example, also be provision that, as in the method according to the prior art, in deceleration of shift-down point R_v is calculated as a function of a regular shift-down point R and a gain factor (v) which is determined by the deceleration (a_l) (see formulas 1 and 2). However, a compensation factor (k), which describes the influence of the transverse acceleration and which is multiplied by the deceleration shift-down point R_v, and therefore results in a compensated shift-down point R_k:

$$R\_k=k*R\_v. \quad (4)$$

is additionally determined.

Figure 3:
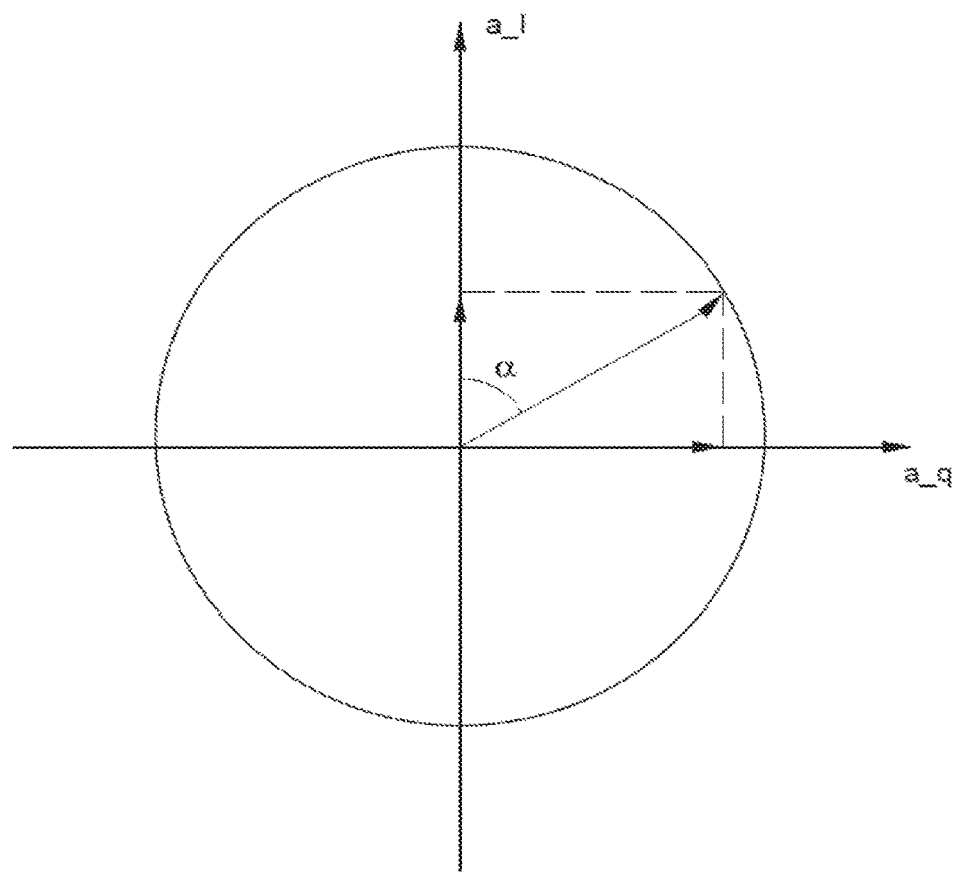
FIG. 3 shows a circle of forces, which describes the influence of a transverse acceleration on the maximum braking force.

The compensator factor k can be determined, for example, from the physical relationship described by the circle of forces illustrated in FIG. 3.

The circle of forces (or also circle of frictional forces) represents a graphic illustration of the maximum transmissible force at a tire. An acceleration or deceleration (a_l) and transverse force (a_q) act on a tire during cornering and result in a total force ages which, in the case of the tire being driven to adherence limit is always as large as the radius of the circle of forces.

The gain factor k can then be obtained by taking into account the circle of forces, for example from the absolute value (ages) of the two-dimensional vectors composed of the deceleration (a_l) and the transverse force (a_q) divided by the deceleration. Instead of the deceleration used to calculate the shift-down point in the prior art, the total force which acts on the wheels is used.

In one alternative embodiment, instead of the transverse acceleration the current steering angle of the vehicle is determined and made available to the control unit. Once more, a total force a ges can be determined by means of the relationship described with the circle of forces. Said total force ages results, for example, from a division of the deceleration (a_l) by the cosine of the steering angle (alpha). The compensation factor is then obtained in analogous fashion to the previous exemplary embodiment from the division of the total force ages by the deceleration (a_l).

In a further alternative embodiment, both the deceleration (a_l), the steering angle (alpha) and the transverse acceleration (a_q) are made available to the control unit. As a result, the two determined total forces are compared and possible interference influences reduced, for example, by means of data fusion and Kalman filtering.

Figure 4:
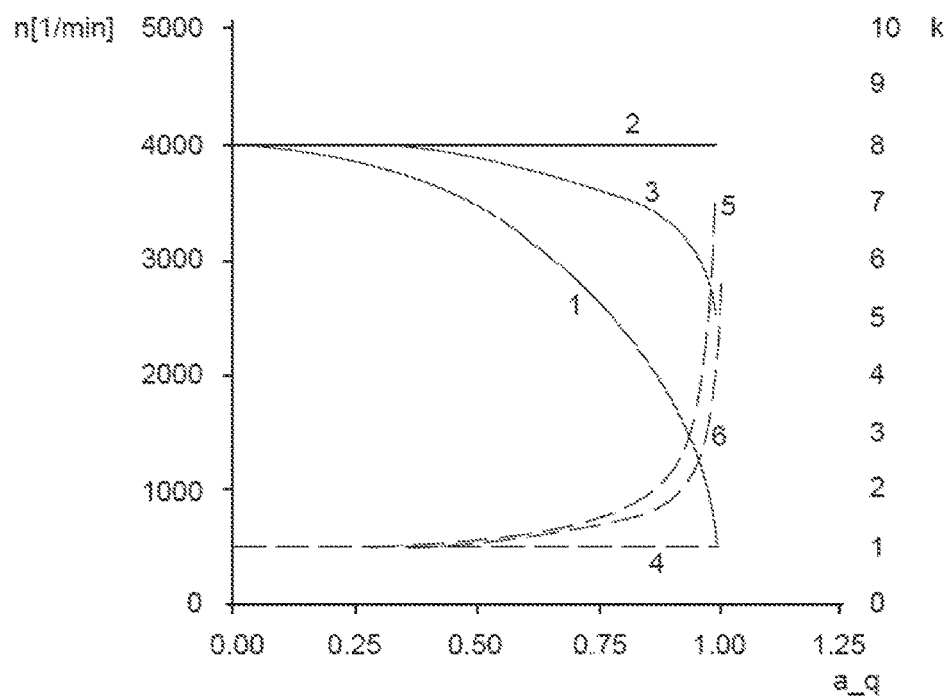
FIG. 4 shows possible characteristic curves for the determination of a compensation factor according to an embodiment of the invention.

In a further alternative embodiment, the compensation factor can be determined from a characteristic curve as is illustrated, for example, in FIG. 4. The dependence on the lateral acceleration can therefore be freely selected. In FIG. 4, the characteristic curves describe: 1) the efficient shift rotational speed without compensation; 2) a rotational speed compensation in the case of an automatic transmission using the physical properties of the circle of forces; 3) a manual rotational speed compensation; 4) a compensation factor equal to 1, corresponding to no compensation; 5) a physically derived compensation factor; and 6) a compensation characteristic curve in the case of manual rotational speed compensation.

In a further alternative embodiment, the gain factor k can be determined from the physical relationship of the circle of forces and additionally amplified or attenuated by means of a characteristic curve. This combination can be achieved, for example, by avoiding undesired amplifications of the shift-down points in specific ranges (e.g. vehicle movement dynamics limiting ranges).

In addition, the gain factor or the compensation factor can also take into account other conditions such as, for example, the current positive gradient or current negative gradient of the road, the selected drive mode such as, for example, EPower, hybrid, normal, sport, race, manual, etc., the driving of the driver and interventions by means of control systems such as, for example, ESP, a traction control system, ABS, etc. These can also be taken into account by means of an additional multiplier.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for controlling an automatic transmission of a vehicle, the method comprising:
   detecting a deceleration of the vehicle;
   detecting a cornering value of the vehicle;
   determining, as a function of the deceleration and as a function of the cornering value, a compensated shift-down point, the compensated shift-down point being a rotational speed at which downshifting of the transmission occurs; and
   selecting a gear as a function of the compensated shift-down point,
   wherein a total force is determined from the deceleration and the cornering value, and
   wherein the compensated shift-down point is raised for an increasing total force.

2. The method of claim 1, wherein a transverse acceleration is detected as a cornering value, and wherein the total force is calculated as an absolute value of a two-dimensional vector with the entries deceleration and transverse acceleration.

3. The method of claim 1, wherein a steering angle is detected as a cornering value, and wherein the total force is determined from a division of the deceleration by the cosine of the steering angle.

4. The method of claim 1, wherein the cornering value of the vehicle is a transverse acceleration of the vehicle.

5. The method of claim 1, further comprising defining a regular shift-down point at which downshifting of the transmission occurs.

6. The method of claim 5, further comprising determining a gain factor that is a function of the deceleration of the vehicle.

7. The method of claim 6, further comprising a deceleration shift-down point based on the regular-shift down point and the gain factor.

8. The method of claim 7, wherein the cornering value of the vehicle is a transverse acceleration of the vehicle, and
   wherein the determining, as a function of the deceleration and as a function of the cornering value, the compensated shift-down point comprises:
      determining a compensation factor that describes an influence of the transverse acceleration, and
      determining the compensated shift-down point based on the compensation factor and the deceleration shift-down point.

9. A control unit for an automatic transmission comprising:
   a first detector configured to detect a deceleration of a vehicle;
   a second detector configured to detect a cornering value of the vehicle;
   a computer configured to:
      determine a total force from the deceleration and the cornering value,
      determine, as a function of the deceleration and as a function of the cornering value, a compensated shift-down point, the compensated shift-down point being a rotational speed at which downshifting of the transmission occurs, wherein the compensated shift-down point is raised for an increasing total force, and
      select a gear as a function of the compensated shift-down point; and
   an output unit designed to transfer the gear to a transmission.

10. An automatic transmission for a vehicle having the control unit of claim 9.

11. A vehicle having the automatic transmission of claim 10.

12. A method for controlling an automatic transmission of a vehicle, the method comprising:
   detecting a deceleration of the vehicle;
   detecting a cornering value of the vehicle;
   determining, as a function of the deceleration and as a function of the cornering value, a compensated shift-down point, the compensated shift-down point being a rotational speed at which downshifting of the transmission occurs; and
   selecting a gear as a function of the compensated shift-down point,
   wherein a compensation factor is determined from a characteristic curve that is a function of a transverse acceleration, and wherein the shift-down point is determined by using the compensation factor.

* * * * *